US008543161B2

(12) United States Patent
Spalink (10) Patent No.: US 8,543,161 B2
(45) Date of Patent: Sep. 24, 2013

(54) METHOD AND APPARATUS FOR MANAGING MOBILE TERMINAL EVENTS (75) Inventor: Karin Spalink, Durham, NC (US)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 928 days.

(21) Appl. No.: 11/277,955

(22) Filed: Mar. 30, 2006

(65) Prior Publication Data

US 2007/0232277 A1 Oct. 4, 2007

(51) Int. Cl.
H04M 1/00 (2006.01)
H04M 1/725 (2006.01)
H04M 3/42 (2006.01)

(52) U.S. Cl.
USPC .......... 455/556.2; 455/412.1; 455/415; 455/550.1

(58) Field of Classification Search
USPC ............................................. 455/556.2
See application file for complete search history.

(56) References Cited

U.S. PATENT DOCUMENTS

| 5,903,632 | A | 5/1999 | Brandon | |
|---|---|---|---|---|
| 6,154,530 | A * | 11/2000 | Letellier | 379/142.06 |
| 6,956,938 | B1 * | 10/2005 | Schaller | 379/201.04 |
| 7,194,257 | B2 * | 3/2007 | House et al. | 455/418 |
| 7,245,941 | B2 * | 7/2007 | Scott | 455/566 |
| 7,383,304 | B2 * | 6/2008 | Shimada et al. | 709/206 |
| 7,409,050 | B1 * | 8/2008 | Li et al. | 379/142.01 |
| 2002/0101459 | A1 * | 8/2002 | Herle et al. | 345/866 |
| 2003/0063732 | A1 * | 4/2003 | Mcknight | 379/210.01 |
| 2003/0073425 | A1 * | 4/2003 | Immonen et al. | 455/406 |
| 2003/0109247 | A1 * | 6/2003 | Lindgren et al. | 455/566 |
| 2004/0102225 | A1 * | 5/2004 | Furuta et al. | 455/566 |
| 2004/0141599 | A1 | 7/2004 | Tang et al. | |
| 2004/0192270 | A1 | 9/2004 | Kreitzer | |

(Continued)

FOREIGN PATENT DOCUMENTS

EP 1148423 10/2001
EP 1298895 A2 4/2003

(Continued)

OTHER PUBLICATIONS

International Preliminary Report on Patentability, corresponding to International Patent Application No. PCT/US2006/041727, dated Jul. 24, 2008.

(Continued)

Primary Examiner — Huy C Ho
(74) Attorney, Agent, or Firm — Patrick B. Horne; Moore & Van Allen PLLC (57) ABSTRACT The wireless terminal selectively stores incoming voice calls and text messages in a common Answer List. The incoming transmissions may be added to the Answer List manually. If the "Answer List" menu option is selected, the incoming transmission data is logged into the Answer List and that entry is deleted from the Missed Call List, Text Message List or Call Log. In this manner, the incoming transmission data may be saved in only one location on the wireless terminal. An entry may also be saved to the Answer List from the wireless terminal's calendar application or web browser application. An entry may be deleted from the Answer List after the entry is responded to. This allows the user to enter wireless terminal related activities in the Answer List such that the list may also include entries that do not arise from an incoming transmission.

21 Claims, 6 Drawing Sheets

(56) References Cited

U.S. PATENT DOCUMENTS

| | | |
|---|---|---|
| 2004/0248598 A1* | 12/2004 | Ding et al. .................... 455/466 |
| 2005/0090290 A1* | 4/2005 | Hama et al. ................... 455/566 |
| 2005/0130631 A1 | 6/2005 | Maguire et al. |
| 2005/0141686 A1 | 6/2005 | Matsunaga et al. |
| 2005/0250483 A1* | 11/2005 | Malik ........................... 455/415 |
| 2006/0073821 A1* | 4/2006 | Rantapuska ................. 455/423 |
| 2006/0094447 A1* | 5/2006 | Zellner ...................... 455/456.3 |
| 2006/0128363 A1* | 6/2006 | Cooling et al. ............ 455/412.1 |
| 2006/0142067 A1* | 6/2006 | Adler ............................ 455/563 |
| 2006/0178135 A1* | 8/2006 | Jiang et al. ................. 455/414.1 |
| 2007/0010292 A1* | 1/2007 | Vetelainen et al. ........... 455/566 |
| 2007/0093235 A1* | 4/2007 | Kimbrell .................... 455/412.1 |
| 2007/0121829 A1* | 5/2007 | Tal et al. .................... 379/93.09 |
| 2008/0132208 A1* | 6/2008 | Lee et al. ....................... 455/411 |

FOREIGN PATENT DOCUMENTS

| | | |
|---|---|---|
| JP | 11041369 A | 2/1999 |
| JP | 2000101743 A | 4/2000 |
| JP | 2002281562 A | 9/2002 |
| JP | 2003152859 A | 5/2003 |
| WO | 0135229 A1 | 5/2001 |

OTHER PUBLICATIONS

Japanese Patent Office; First Office Action; Dec. 13, 2010; issued in Japanese Patent Application No. 2009-502757.

State Intellectual Property Office, P.R. China; First Office Action; Dec. 16, 2010; issued in Chinese Patent Application No. 200680054079.X.

Japanese Patent Office; Final Rejection; Aug. 10, 2012; issued in Japanese Patent Application No. 2009-502757.

Japanese Patent Office; Final Office Action; Oct. 5, 2011; issued in Japanese Patent Application No. 2009-502757.

Indian Patent Office; First Examination Report; Apr. 12, 2013; issued in Indian Patent Application No. 5505/CHENP/2008.

* cited by examiner

FIG. 1

ANSWER LIST

| Day 1 | | | |
|---|---|---|---|
| Time | Mode | Call No. | Transmission Data |
| 8:01 | Text | E-mail Address | Name xxx |
| 8:45 | Calendar | Phone No. | Calendar Entry |
| 10:01 | Bookmark | IP Address | Web Site Name |
| 11:31 | Voice Call | Phone No. | Name xxx |
| 12:10 | Text | E-mail Address | Name xxx |
| 13:20 | Voice Call | Phone No. | Name yyy |
| 15:05 | Voice Call | Phone No. | Name zzz |
| Day 2 | | | |
| 12:00 | Calendar | Phone No. | Calendar Entry |

METHOD AND APPARATUS FOR MANAGING MOBILE TERMINAL EVENTS

BACKGROUND

The invention relates generally to incoming transmissions for mobile terminals and more particularly to a method and apparatus for managing incoming voice calls, incoming text messages and other mobile terminal activities to facilitate the user's response to those events.

It will be appreciated that mobile terminals may include cellular phones, PCS phones, personal digital assistants, computers with wireless connectivity or the like where the mobile terminal may communicate with other terminals over a wireless network and the public switched telephone network, the internet, private networks or other networking facilities. The wireless terminal may be connected to the network over an air interface using GSM, CDMA, TDMA, GPRS, EDGE, UMTS or other standardized or proprietary transport as is known.

In addition to receiving voice messages it is known that wireless devices may receive and transmit text messages using short message service (SMS) enhanced messaging service (EMS) or multimedia messaging service (MMS). One protocol for transmitting text messages such as e-mail is the wireless application protocol (WAP). 3G offers higher bandwidth services that support applications such as e-mail. 3G is defined in multiple standards including UMTS, W-CDMA and CDMA2000. The invention described herein is useful with any mobile terminal that is capable of receiving voice, text and other multimedia transmissions regardless of the specific technology protocol.

Many wireless terminals include call management systems such as Missed Call lists and Text Message lists. Such lists may be created automatically by the wireless terminal based on recent call events such as incoming voice calls or text messages. It is known to create separate lists where the incoming voice calls or text messages are stored in separate lists based on the mode of the communication. The user must access and monitor the lists independently of one another in order to obtain all incoming transmission data. Because the different types of transmission data are stored and displayed separately it is difficult for the user to systematically respond to the incoming transmissions. Moreover, it is known to record other activities in separate lists such as web browser bookmarks and calendar entries. As a result the user may be required to access and monitor multiple sources to obtain a view of all of the wireless terminal's related activities.

SUMMARY OF THE INVENTION

In one embodiment of the invention, the wireless terminal selectively stores incoming voice calls and text messages in a common Answer List. The incoming transmissions may be added to the Answer List manually. For example when a incoming transmission is received on the wireless terminal, a menu option "Answer List" is displayed that, if selected by the user, enters the call or text message transmission data into the Answer list. If the "Answer List" menu option is not selected, the wireless terminal maintains the incoming transmission data in the Missed Call list, Call Log or Text Message list as appropriate. If the "Answer List" menu option is selected, the incoming transmission data is logged into the Answer List and that entry is not posted to the Missed Call List or Text Message List.

An entry may also be saved to the Answer List from the wireless terminal's calendar application or web browser application. This allows the user to enter wireless terminal related activities in the Answer List such that the list may also include entries that do not arise from an incoming transmission.

Once the Answer List is created all of the saved incoming transmissions, both text messages and voice calls, as well as other activities may be displayed in a single list. The Answer List displays the frequency, sequence and mode (voice or text) of the incoming transmissions. For example, the user can determine from the Answer List if the wireless terminal has received multiple text and voice calls from a party and the time and mode of each transmission. The user can determine the priority for answering the communications and the appropriate mode, either voice or text, for the response. To respond to an incoming transmission, the user may highlight an entry on the Answer List and initiate a connection with the highlighted device based on the call data stored in the Answer List. Because the Answer List may also include other events such as calendar entries and web page bookmarks, the Answer List may also be used to schedule responses that are not directly related to an incoming transmission.

The Answer List may be displayed automatically at a particular time, for example, once per day. Likewise the Answer List may be cleared automatically, for example, the list may be cleared every 24 hours, such that the Answer List presents only the entries for a single day. The entries also may be deleted from the list manually or upon the occurrence of an event such as the completion of a return transmission.

DETAILED DESCRIPTION

The following detailed description of preferred embodiments refers to the accompanying drawings, which illustrate specific embodiments of the invention. Other embodiments having different structures and operations do not depart from the scope of the present invention.

In the instant disclosure the term "incoming transmission" refers to a voice calls, including PTT (push to talk) alerts, or text messages received by a wireless terminal. "Transmission data" is used to refer to information or data stored in a wireless terminal, or accessible via the wireless terminal, where the data identifies an entity, such as a person identified by name, or a call number associated with an incoming voice call or a text message, or other identification information associated with an incoming transmission such as the mode or time of transmission. "Call number" is used to identify a string of characters from which a connection may be established from the wireless terminal. The call number may be a phone number, a fax number, an internet IP address, e-mail address or other such character string that allows connection to another device. "Text Message List" refers to data stored in a wireless terminal, or accessible via the wireless terminal, related to a received text message such as an e-mail Inbox. "Missed Call List" refers to data related to missed (unanswered) calls and typically includes the call number of the calling party and may include other transmission data. "Call Log" refers to the log of completed transmissions, both incoming and outgoing, maintained by the wireless device. The communication data in the Text Message List, Call Log and the Missed Call List are typically saved automatically by the wireless device.

Figure 1:
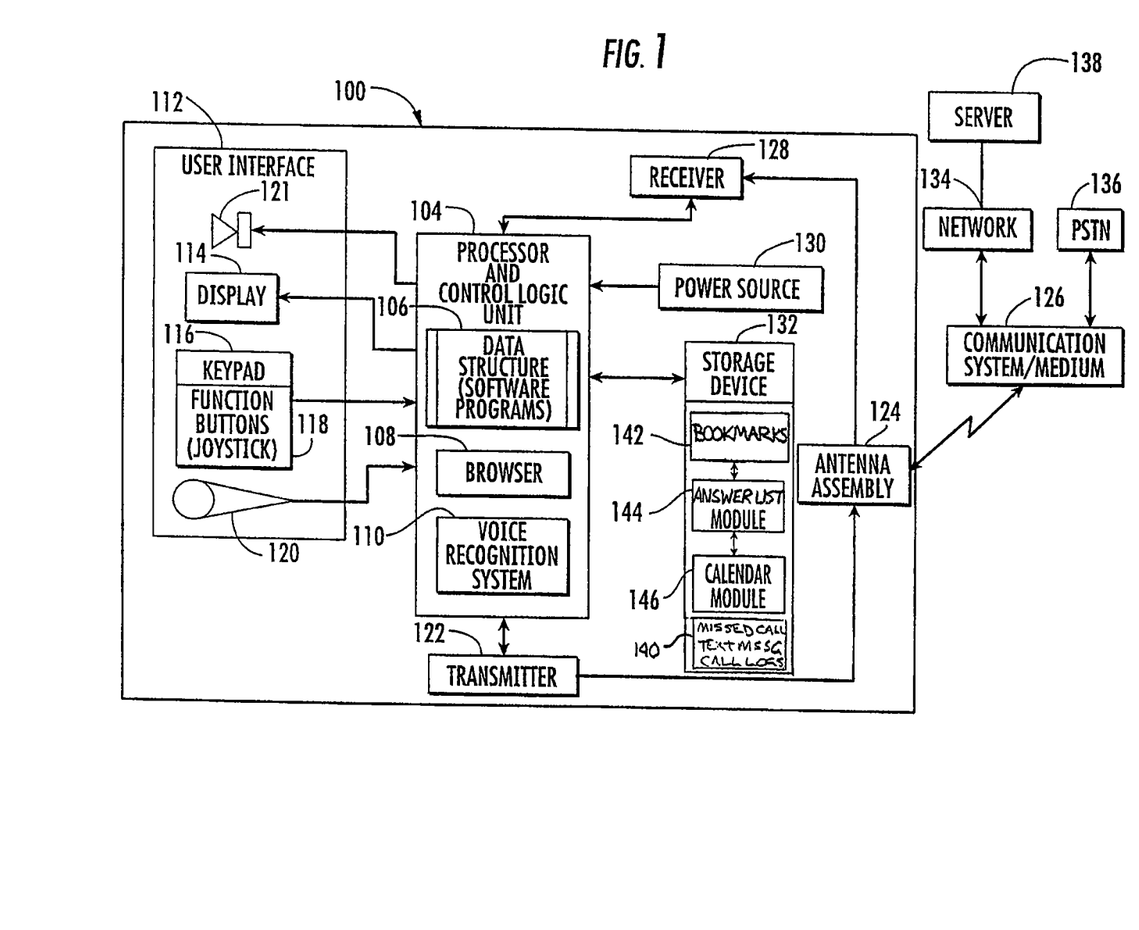
FIG. 1 is a block schematic diagram of an example of a wireless terminal including functionality in accordance with an embodiment of the present invention.

FIG. 1 is a block schematic diagram of an example of a communications device 100, comprising a wireless terminal, including functionality in accordance with an embodiment of the present invention. The communications device 100 may include a processor and control logic unit 104. The processor and control logic unit 104 may be a microprocessor or the like. The processor and control logic unit 104 may include application modules, data structures or software programs 106 including computer-executable or computer-readable instructions to control operation of the communications device 100 and its components. The processor and control logic unit 104 may also include a browser 108 and voice recognition system 110.

The communications device 100 may include an operator or user interface 112 to facilitate controlling operation of the communications device 100 including initiating and conducting phone calls and other communications. The user interface 112 may include a display 114 to provide visual signals to a subscriber or user as to the status and operation of the communications device 100. The display 114 may be a liquid crystal display (LCD) or the like capable of presenting color images. The display 114 provides information to a user or operator in the form of images, text, numerals, characters, a graphical user interface (GUI) and the like. The user interface 112 may also include a keypad 116 and function keys or buttons 118 including a point device, such as a joystick or the like. The function buttons may comprise soft key pop-up menus. It is to be understood that a soft key pop-up menu comprises one or more menu entries or functions displayed on the display 114 where the menu entry can be selected by depressing a physical button or other device. The functions associated with the soft key pop menu are software controlled such that the functions can be changed for different applications. The keypad 116, function buttons and joystick 118 permit the user to communicate commands to the communications device 100 to dial phone numbers, initiate and terminate calls, establish other communications, such as access to the Internet, send and receive email, text messages and the like. The keypad 116, function buttons and joystick 118 may also be used to control the operation of the communications device 100 to enable the Answer List functionality of the invention.

The user interface 112 may also include a microphone 120 and a speaker 121. The microphone 120 may receive audio or acoustic signals from a user or from an acoustic source, such as a radio, television or the like. The microphone 120 may convert the audio or acoustic signals to electrical signals. The microphone 120 may be connected to the processor and logic unit 104 wherein the processor and logic unit 104 may convert the electrical signals to baseband communication signals. The processor and control logic unit 104 may be connected to a transmitter 122 that may convert baseband signals from the main processor and control logic unit 104 to radio frequency (RF) signals. The transmitter 122 may be connected to an antenna assembly 124 for transmission of the RF signals to a communication medium or system 126.

The antenna assembly 124 may receive RF signals over the air and transfer the RF signals to a receiver 128. The receiver 128 may convert the RF signals to baseband signals. The baseband signals may be applied to the processor and control logic unit 104 which may convert the baseband signals to electrical signals. The processor and control unit 104 may send the electrical signals to speaker 121, which may convert the electrical signals to audio signals that can be understood by the user.

A power source 130 may be connected to the processor and control logic unit 104 to provide power for operation of the communications device 100. The power source 130 may be a rechargeable battery or the like. The communications device 100 may also include at least one data storage device 132. The data storage device 132 may store lists of call numbers. Examples of the lists may include Missed Call Lists, Text Message Lists, Call Logs 140 and bookmarks 142 stored in a portion of the storage device 132. The data storage device also includes the Call Answer List application 144 containing the Answer List data shown in FIG. 2. The data storage device 132 may be a computer-readable medium to store computer-executable or computer-usable instructions or data structures, such as data structures or applications 106, to perform special operations or functions such as those described in accordance with embodiments of the present invention.

The communications device 100 may be operable in association with a communications system or medium 126 in accordance with an embodiment of the present invention. The communications system or medium 126 may be a mobile, wireless, cellular communications system or similar system. The communications system 126 may couple the communications device 100 to another communication network 134 or to a public switched telephone network 136.

The communications device 100 may be a mobile terminal such as a cordless telephone, cellular telephone, personal digital assistant (PDA), communicator, computer device or the like and is not unique to any particular communication standard, such as Advanced Mobile Phone Service (AMPS), Digital Advanced Mobile Phone Service (D-AMPS), Global System for Mobile Communications (GSM), Code Division Multiple Access (CDMA), Time Division Multiple Access (TDMA), UMTS, W-CDMA, CDMA2000 or the like. The layout and design illustrated in FIG. 1 is for purposes of explaining the present invention and the present invention is not limited to any particular design. While the communications device 100 illustrated in FIG. 1 is a mobile terminal, the present invention may also be applicable to wired or hard wired communication devices and systems.

It should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media is conceptually illustrated at 132 of FIG. 1 as a fixed storage media, but it could also be a removable optical or magnetic disc or tape. The computer program instructions can reside on any medium that can contain, store, communicate, propagate, or transport computer program code for execution by any type of computing platform, instruction execution system, or collection of such systems interconnected via a bus or network. Such a computer readable medium may be, for example, but not limited to, an electronic, magnetic, optical, electromagnetic, infrared, or semiconductor system, device, or propagation medium. Other examples of the computer-readable medium would include an electrical connection having one or more wires, a portable computer diskette or portable fixed disk, an optical fiber, a compact disc read-only memory (CD-ROM), and a digital versatile disc read-only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. Computer program instructions which implement all or a portion of the invention may also be embodied in a stream of information being retrieved over a network such as the Internet. The terms module, application or application module are meant to refer to a specific process that is performed as part of the system discussed throughout and typically comprise software applications.

Figure 2:
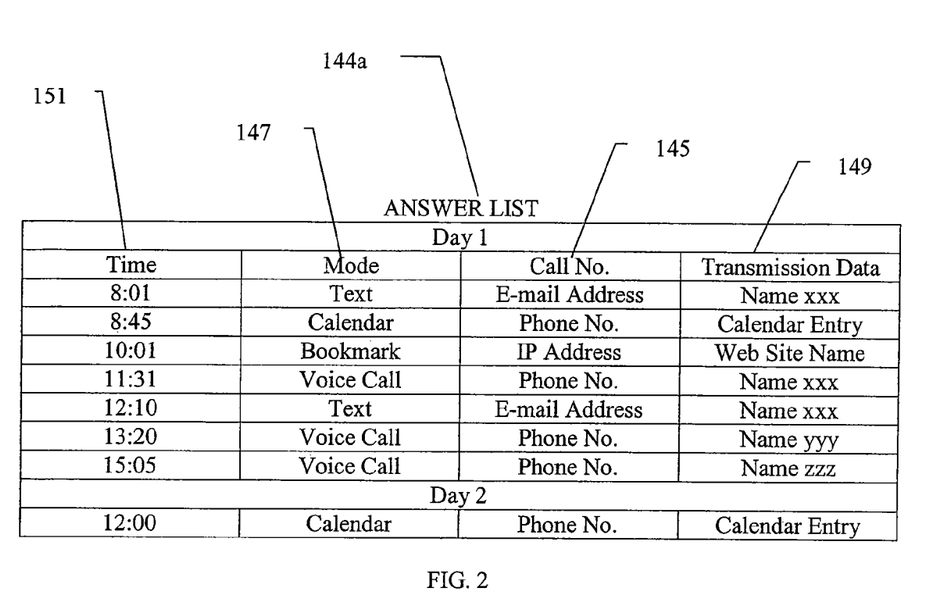
FIG. 2 shows a depiction of one embodiment of the data structure of the Answer List.

The operation of the system of the invention will now be explained with respect to FIGS. 1 and 2. The Answer List 144a is stored in storage device 132 and comprises a list of entries where each entry includes a call number 145 such that the selection of an entry on the Answer List may initiate a transmission to the call number. Each entry may also include the mode 147 of the entry and other transmission data 149. For incoming transmissions the mode refers to whether the incoming transmission was a text message or voice call. For other wireless activities the mode refers to the source of the entry, e.g. web browser application or calendar application. In the illustrated embodiment the entries are listed by time of entry into the list 151. The list may be subdivided into days such that the entries for different days of the week are segregated on the Answer List. In one embodiment, the Answer List displays a single day's entries when the Answer List is displayed on the wireless terminal. It will be appreciated that the Answer List could be organized other than by time and that the organization may be other than a 24 hour day.

Figure 3:
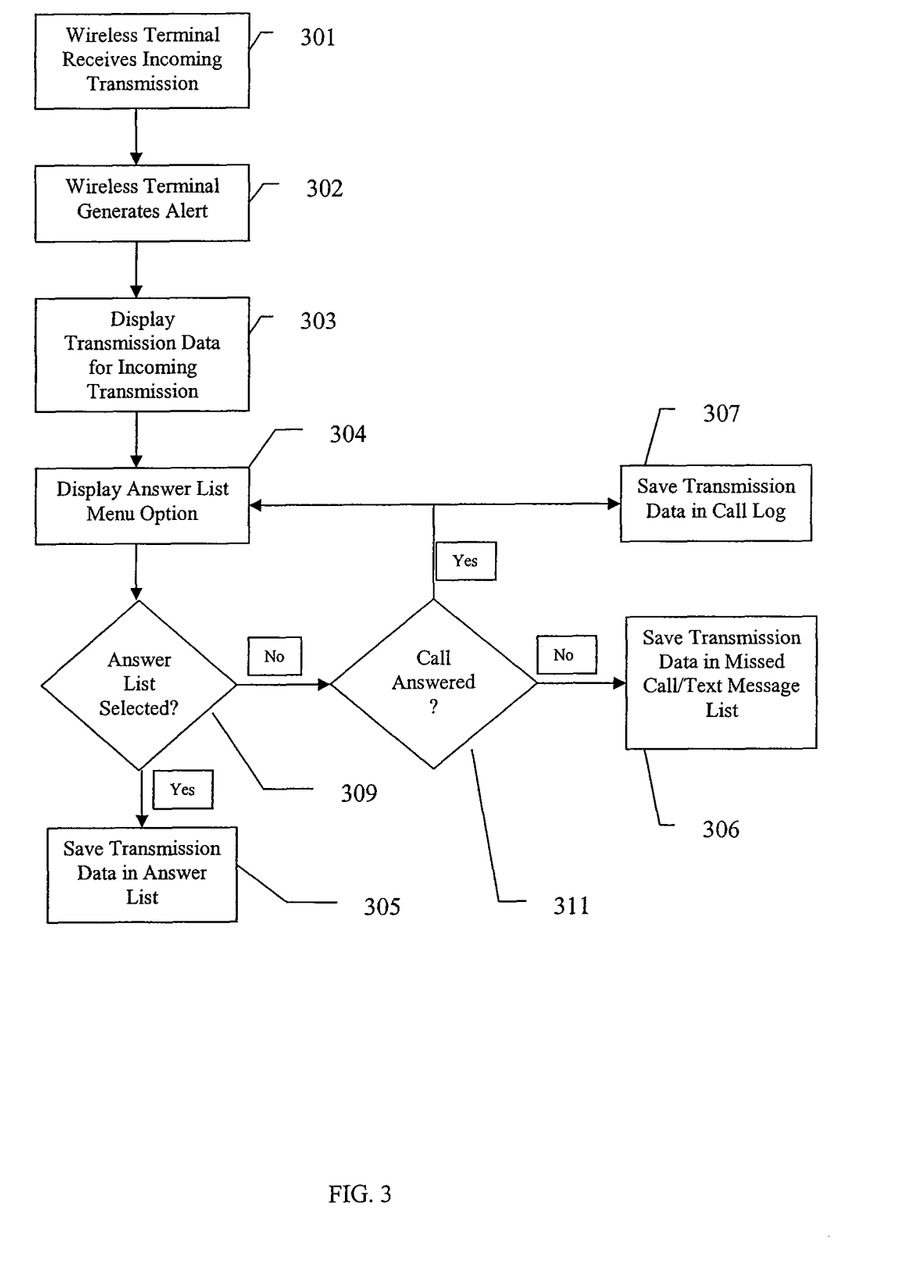
FIGS. 3 through 6 are flow charts illustrating methods for populating the Answer List in accordance with embodiments of the present invention.

Referring to FIG. 3, one mechanism for entering data in the Answer List 144a, uses the transmission data the wireless terminal receives for incoming voice calls or text messages. When an incoming transmission is received (block 301), the wireless terminal generates an alert such as an audible tone, visual display and/or physical alert (e.g. vibration) to alert the user to the incoming call or text message (block 302). The transmission data for the incoming transmission is displayed on the display 114 (block 303). Menu options for handling the incoming transmission including an "Answer List" menu option are also displayed (block 304). The menu options may be presented via a graphic user interface such as a soft key pop-up menu or by hard keys. In addition to the Answer List menu option the user may be presented with other call handling options such as "answer". Likewise for text messages, the Answer List menu option is provided as one option when a text message alert is received or a text message list item is selected or opened in addition to other menu options such as "delete", "respond", "forward" or the like.

If the user selects the Answer List menu option (block 309), the Answer List application 144 is launched in processor and control logic unit 104 and the incoming transmission data is saved in the Answer List 144a in data storage device 132 (block 305). If the user does not select the "Answer List" menu option, the transmission data is saved in the Text Message List if it is a text message such as a SMS or MMS message, e-mail or other data message or in the Missed Call List if it is a voice call (block 306).

The system of the invention also allows the user to answer the incoming transmission by selecting an "answer" menu option. When an incoming transmission is answered (block 311), the transmission data for that transmission is stored in a Call Log (block 307). If the user selects the Answer List menu option (block 309), the Answer List application is launched in processor and control logic unit 104 and the incoming transmission data is saved in the Answer List in data storage device 132 (block 305). If the user answers the incoming communication but does not select the Answer List menu option, the call data is saved only in the wireless terminal's Call Log (block 307). For a text message, if the Answer List application is not selected the text message is stored in the Text Message List such as an e-mail inbox.

Figure 4:
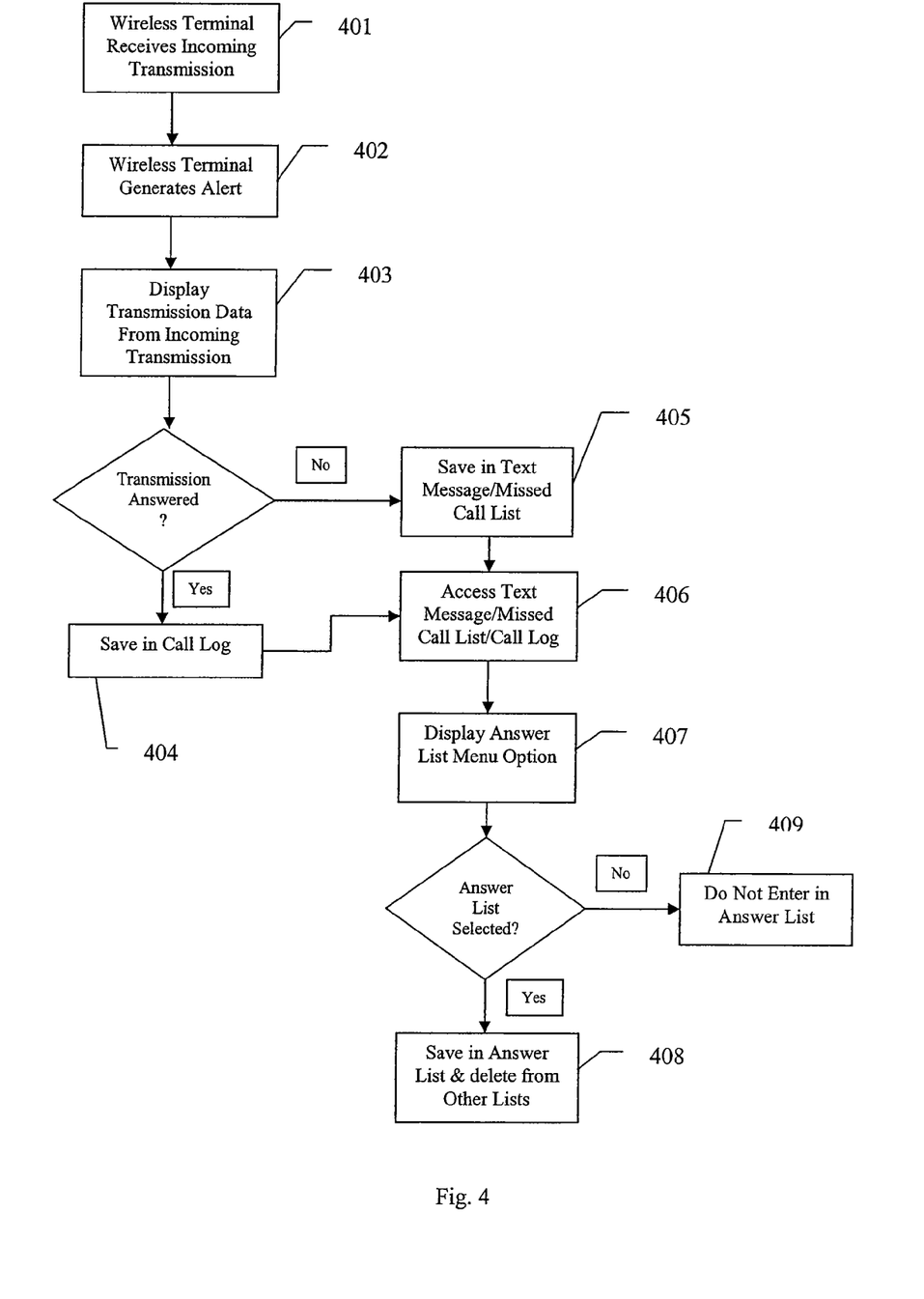

Referring to FIG. 4, in an alternate embodiment of the invention, the transmission data for the incoming transmissions is automatically saved in either the Missed Call List or the Text Message List as is known. When an incoming transmission is received by the wireless terminal (block 401), the wireless terminal generates an alert (block 402) and displays the transmission data (block 403) as is known. If the call is answered the transmission data is automatically stored in the call log (block 404). If the call is not answered the transmission data is stored in the Missed Call List or Text Message List as appropriate based on the mode of the call (block 405). These lists may be accessed by selecting the appropriate menu option (block 406). When an entry from one of these lists is highlighted, the user is presented with the "Answer List" menu option (block 407). The "Answer List" menu option may be one of a number of menu options presented to the user such as "Call/Send", "Delete" or the like. If the Answer List menu option is selected (block 410), the Answer List application is launched and the highlighted entry is stored as part of the Answer list and is deleted from either the Missed Call List, Call Log or the Text Message List where it was previously stored (block 408). If the Answer List menu option is not selected, the transmission data is not transferred to the Answer List and remains in the Missed Call List, Call Log, or Text Message List (block 409).

Another mechanism for entering incoming transmission data to the Answer List may be performed automatically by the wireless device. When an incoming transmission is received by the wireless terminal, the wireless terminal can store the transmission data in the Answer List as the default storage rather than storing the information in either the Missed Call list or the Text Message List. The user can then access the Answer List to delete an item from the answer list and save it in either the Missed Call List or the Text Message List.

Figure 5:
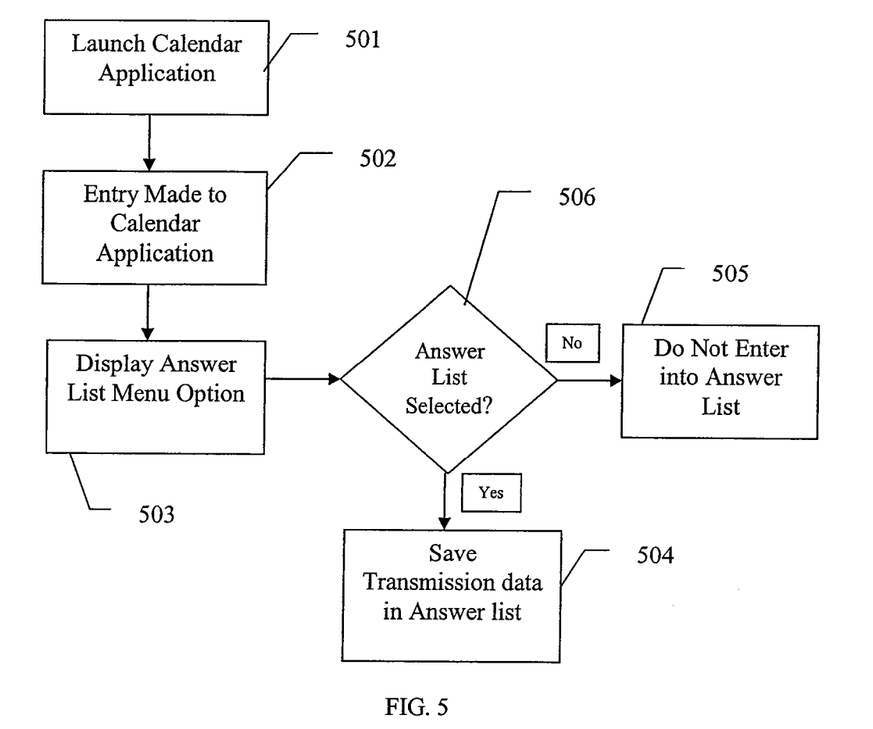

Referring to FIG. 5, yet another mechanism for saving transmission data in the Answer List utilizes the wireless terminal's calendar application module. It will be appreciated that most wireless devices include a calendar application that allows the user to schedule events such as meetings, phone calls, appointments or the like. The calendar application also includes functionality that allows the wireless device to take action based on the calendared information. For example, it is known that the wireless device may provide an alert to the user and/or display a calendared entry at a predetermined time. In one embodiment of the invention, entries may be made to the Answer List from the calendar application (block 501). When an entry to the calendar is made (block 502), such as by scheduling an appointment, the calendar application displays the Answer List menu option (block 503). If the Answer List menu option is selected (block 506), the Answer List application is launched and the information that was entered into the calendar application, including transmission data such as a relevant phone number, is copied to the Answer List for the day of the calendar entry (block 504). In this embodiment the calendar entry is not deleted such that the information is saved in both the calendar application and the Answer List. The entered information will be displayed as part of the Answer List on the scheduled day. Alternatively, rather than displaying all of the information from the calendar entry on the Answer List, the Answer List could simply display a link indicating that a calendar entry for that day has been added to the Answer List. When the link is selected the calendar module of the wireless device may be launched to display the entered information. If the Answer List menu option is not selected, the transmission data is not copied to the Answer List (block 505).

Figure 6:
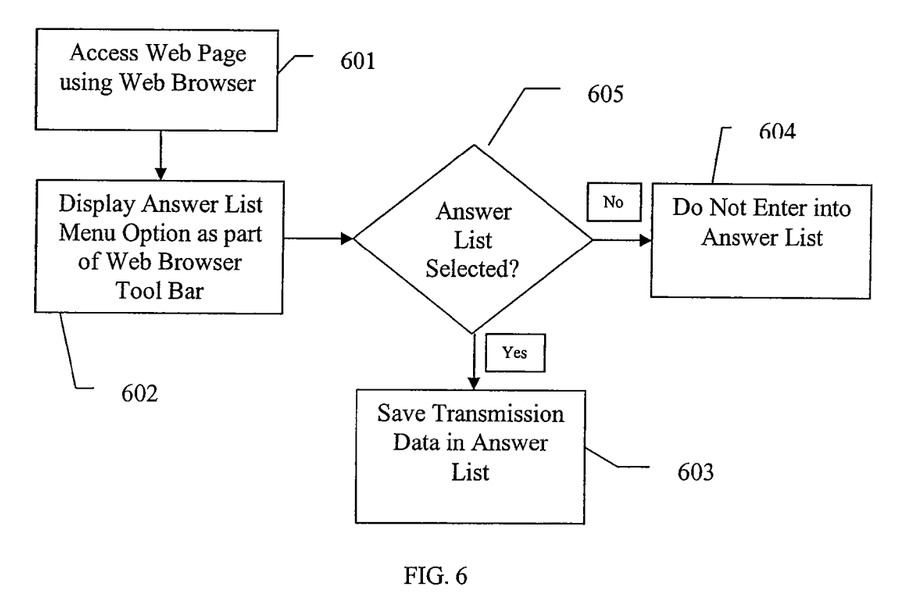

Referring to FIG. 6, another option for entering information into the Answer List makes use of the wireless device web browser application module. Web browser applications are known that have the functionality of bookmarking (saving) a web page IP address in a bookmark file. In the system of the invention, the web browser is provided with an Answer List menu option. A web page is displayed using the web browser (block 601) and the Answer List menu option is displayed as part of the web browser tool bar (block 602). If the Answer List menu option is selected (block 605), the Answer List application is launched and the transmission data, such as the IP address and web site name, is copied to the Answer List (block 603). In this embodiment the IP address may also be saved in the Bookmark of the web browser. When the user accesses the Answer List the bookmark will be presented as one entry in the Answer List. If the Answer List menu option is not selected, the transmission data (IP web address) is not transferred to the Answer List (block 604).

Once the Answer List is populated with incoming transmission data, web page IP addresses and/or calendar entries, it may be displayed on display 114 and used to facilitate a systematic response to the entries. An embodiment of the Answer List displayed on the wireless terminal is shown at 700 in FIG. 7. The Answer List 700 can be accessed by the user from the wireless device main menu by selecting a "Display Answer List" menu option. The Answer List will display all saved entries for that day, including incoming voice and data transmissions, on a single list including both missed calls and unread text messages. It is to be appreciated that the Answer List may also include voice calls that were answered, text messages that have been read by the user, calendar entries or web page "bookmarks". In one preferred embodiment, once an entry on the Answer List is replied to, that entry is deleted from the Answer List. The Answer List may sort and display the entries chronologically (as shown), alphabetically by transmission data or by mode. Alternatively the entries may be sorted and displayed by a user assigned priority. For example, entries from a first call number (home) may be displayed first, followed by entries from a second call number (work) and so on. In this manner display of the list may be customized for a particular user's needs. The displayed entries may include icons 701 identifying the mode of transmission or source of the entry, time of entry into the Answer List 702, and an identification of the source such as a person's name, website name or the like 703. The Answer List may also display the call number 704 for an entry.

Figure 7:
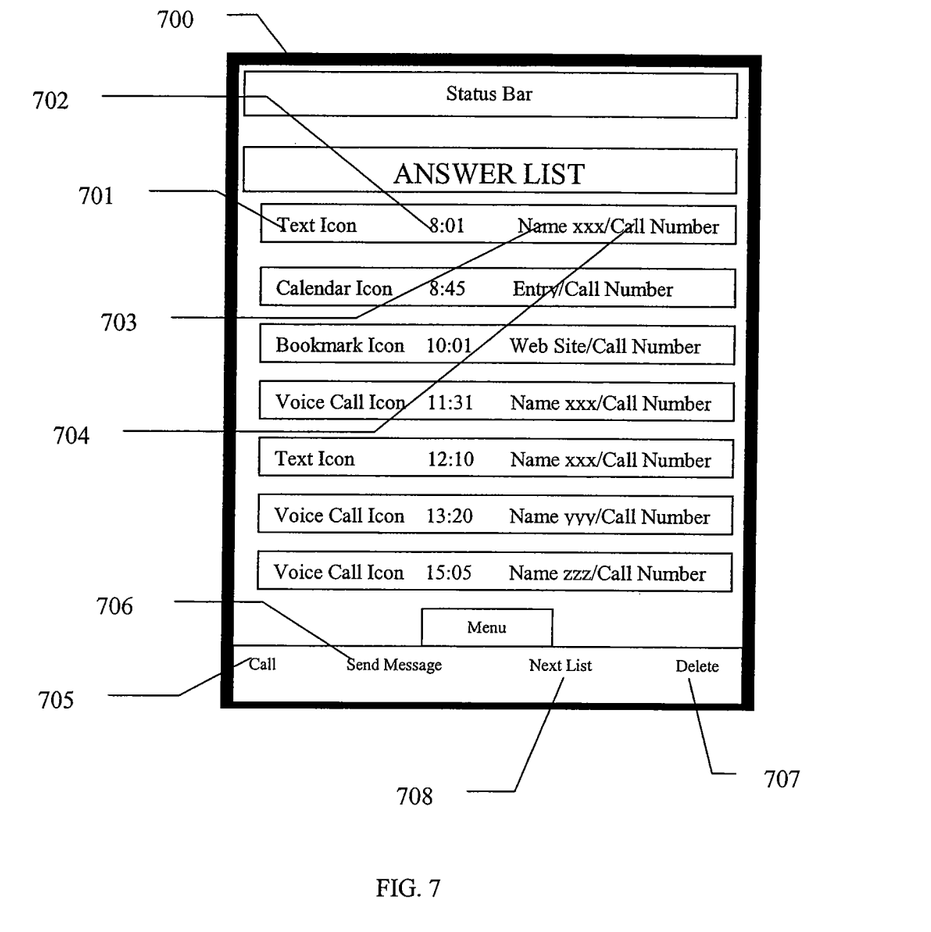
FIG. 7 shows a screen shot illustrating an embodiment of the user interface for the system of the invention.

The user can easily determine if multiple text and voice communications from the same source were received in a particular period of time. Because the Answer List shows all incoming transmissions regardless of source or type, the user can quickly review all incoming transmissions prior to responding. Also, because the user has access to both voice calls and text messages, the user can determine the appropriate method for responding and can respond either by text message or by voice call or both by selecting the appropriate entry and selecting the call menu option 705 or the send message menu option 706.

In one embodiment, the Answer List may be automatically cleared every 24 hours such that each day the Answer List only contains unanswered transmissions from that day. The time period may be other than 24 hours. The time period may also be changeable by the user such that the system could be modified by the user. The user may also delete entries from the list by selecting the "delete" menu option 707. Entries may also be deleted from the list automatically if a connection is completed to a call number associated with one of the Answer List entries. The menu may also present a "next list" menu option 708 such that the next list (the Answer List for the next day) may be displayed.

Specific embodiments of an invention are disclosed herein. One of ordinary skill in the art will recognize that the invention has other applications in other environments. For example, the menu options have been described with specific labels such as "Answer List". It will be understood that the menu options may be labeled with other descriptors provided that the functionality of the button corresponds to the functionality of the button as described herein. Many embodiments are possible. The following claims are in no way intended to limit the scope of the invention to the specific embodiments described above.

The invention claimed is:

1. A method of event management on a wireless terminal comprising:
   receiving at least one incoming wireless transmission;
   displaying an answer list menu option to a user in response to receiving the at least one incoming wireless transmission, the answer list menu option presenting an option to indicate a desire to store data identifying the at least one incoming wireless transmission in an answer list instead of immediately answering the at least one incoming wireless transmission, wherein the answer list comprises a plurality of entries comprising the data identifying the at least one incoming wireless transmission and at least one of data identifying a second incoming wireless transmission, data identifying a calendar entry or webpage transmission data;
   storing, in a storage device, answer list data identifying the at least one incoming wireless transmission in an answer list in response to the answer list menu option being selected indicating that a user desires to store the answer list data in the answer list instead of immediately answering the at least one incoming wireless transmission, wherein the answer list is separate from a missed call/text list comprising missed call/text data that is stored in response to the answer list menu option not being selected; and
   displaying the answer list, wherein the entries of the answer list are displayed based on a user assigned priority.

2. The method of claim 1, further comprising
   transmitting a text message or voice call based on said answer list data,
   storing data associated with the at least one incoming wireless transmission in one of a missed text message list or a missed call list instead of the answer list in response to the answer list menu option not being selected;
   removing individual entries of the answer list data associated with the at least one incoming wireless transmission from the answer list upon completion of a return transmission associated with the individual entry.

3. The method of claim 1 wherein said answer list data includes at least one of a call number and a web address, and wherein the at least one of a call number and a web address is retrieved from the answer list.

4. The method of claim 3 wherein the at least one of a call number and a web address is stored on said wireless terminal.

5. The method of claim 1 wherein the wireless terminal includes a calendar for storing calendar data, said calendar data being stored in the answer list.

6. The method of claim 5 wherein the calendar data includes a call number associated with a calendar entry.

7. The method of claim 6 further including establishing a link to the call number.

8. The method of claim 1 wherein the step of transmitting a text message or voice call based on said call data comprises using a soft key.

9. The method of claim 1 wherein displaying includes segregating the data by time period.

10. A method of call management on a wireless terminal comprising:
   initiating a calendar application;
   storing, in a mobile device, a calendar entry in the calendar for an event, wherein calendar entry comprises a call number and a date of the event;
   displaying an answer list menu option to a user in response to storing the calendar entry;
   displaying an answer list comprising a plurality of entries comprising the call number on the date of the event and at least one of data identifying an incoming wireless transmission, data identifying a second calendar entry or webpage transmission data, wherein the answer list is separate from the calendar application, in response to the answer list menu option being selected indicating that a user desires to store the call number in the answer list, wherein the entries of the answer list are displayed based on a user assigned priority; and
   calling the call number from the answer list.

11. A wireless terminal comprising:
   a calendar application;
   a storage application for storing an entry in the calendar including a call number;
   a processor configured for displaying an answer list menu option to a user in response to the storing the entry in memory;
   a storage member for storing the call number in an answer list that is separate from the calendar application in response to the answer list menu option being selected indicating that a user desires to store the call number in the answer list, the answer list comprising a plurality of entries comprising the call number and at least one of data identifying an incoming wireless transmission, data identifying another calendar entry or webpage transmission data;
   a display for displaying the answer list, wherein the entries of the answer list are displayed based on a user assigned priority; and
   means for calling a call number from the answer list.

12. The wireless terminal of claim 11 wherein the wireless terminal comprises one of a cell phone or a computer.

13. The wireless terminal of claim 11 further comprising:
   a menu option for storing call data of text messages and voice calls in a list when selected; and
   a storage device that stores the call data associated with the text messages and voice calls in said list responsive to selection of the menu option;
   wherein individual entries of the call data associated with the text messages and voice calls are deleted from the answer list upon completion of a return transmission associated with the individual entry, and
   wherein when the menu option is not selected, the call data associated with the calendar entry and the text messages and voice calls is stored in one of a text message list or a missed call list.

14. The wireless terminal of claim 11 wherein means for calling includes a soft key button with a pop-up menu.

15. The wireless terminal of claim 11 wherein the call number comprises one of a phone number or an internet address.

16. The wireless terminal of claim 11 wherein the answer list comprises the call number as well as text messages and voice calls sent to the answer list instead of a missed call list.

17. A wireless terminal comprising:
   a web browser application for a displaying a web page in a web browser;
   a menu option presented in response to displaying the web page, wherein the menu option, when selected, allows for storing of transmission data of the web page in an answer list that is separate from the web browser application, wherein the answer list comprises a plurality of entries comprising the web page transmission data and at least one of data identifying an incoming wireless transmission, data identifying a calendar entry or second web page transmission data;
   a storage device that stores the transmission data of the web page in the answer list when the menu option is selected, wherein the answer list comprises the transmission data, text messages and voice call numbers for future reference for a user; and
   an answer list application to present, in response to the menu option being selection, the transmission data of the web page and the at least one of data identifying an incoming wireless transmission, data identifying a calendar entry or second web page transmission data to the user, wherein the entries of the answer list are displayed based on a user assigned priority.

18. A wireless terminal comprising:
   a receiving member for receiving at least one incoming wireless transmission;
   a menu option for storing call data of at least one incoming wireless transmission in an answer list, wherein the answer list comprises a plurality of entries comprising the call data of the at least one incoming wireless transmission and at least one of data identifying a second incoming wireless transmission, data identifying a calendar entry or webpage transmission data;
   a storage device that stores the call data associated with the at least one incoming wireless transmission in said answer list responsive to selection of the menu option, wherein the answer list is separate from a missed call/text list comprising missed call/text data that is stored in response to the menu option not being selected;
   a displaying member for displaying said answer list comprising entries for the at least one incoming wireless transmission associated with the call data and the data identifying a second incoming wireless transmission, data identifying a calendar entry or webpage transmission data, wherein the entries of the answer list are displayed based on a user assigned priority and based on a time that said call data was stored in said list; and
   means for transmitting a wireless transmission to a number of the at least one incoming wireless transmission.

19. The wireless terminal of claim 18 further including means for saving a web page address in said answer list.

20. The wireless terminal of claim 18 further including means for saving an entry from a calendar application in said answer list.

21. The wireless terminal of claim 18 further including means for deleting entries from said answer list automatically.

* * * * *